United States Patent
Chalasani et al.

(10) Patent No.: US 12,405,956 B2
(45) Date of Patent: Sep. 2, 2025

(54) SYSTEM FOR MANAGING VENDOR DATA

(71) Applicant: Wells Fargo Bank, N.A., San Francisco, CA (US)

(72) Inventors: Nalini Krishna Teja Chalasani, Edison, NJ (US); Maximilian Fuchs, Charlotte, NC (US); Dinesh Jagadeesan, Edison, NJ (US); Kaustubh Kondhawekar, Edison, NJ (US); Vito A. Marchiano, Staten Island, NY (US); Ryan Charles Strid, New York, NY (US)

(73) Assignee: Wells Fargo Bank, N.A., San Francisco, CA (US)

( * ) Notice: Subject to any disclaimer, the term of this patent is extended or adjusted under 35 U.S.C. 154(b) by 101 days.

(21) Appl. No.: 18/516,075

(22) Filed: Nov. 21, 2023

(65) Prior Publication Data

US 2025/0165474 A1    May 22, 2025

(51) Int. Cl.
    *G06F 16/2455*    (2019.01)
(52) U.S. Cl.
    CPC ............................. *G06F 16/24552* (2019.01)
(58) Field of Classification Search
    CPC .................................................. G06F 16/24552
    See application file for complete search history.

(56) References Cited

U.S. PATENT DOCUMENTS

| 7,818,233 | B1 | 10/2010 | Sloan et al. |
| 10,089,366 | B2 | 10/2018 | Paulsen et al. |
| 10,437,889 | B2 | 10/2019 | Greystoke et al. |
| 11,200,173 | B2 | 12/2021 | Alagumuthu |
| 11,350,876 | B2 | 6/2022 | Poon et al. |
| 11,392,875 | B2 | 7/2022 | Carstens et al. |
| 11,502,857 | B2 | 11/2022 | Deng et al. |
| 11,663,662 | B2 | 5/2023 | Chen et al. |
| 12,278,747 | B1 * | 4/2025 | Vippagunta ......... H04L 43/0817 |
| 2014/0058775 | A1 | 2/2014 | Siig et al. |
| 2017/0371926 | A1 | 12/2017 | Shiran et al. |
| 2021/0142342 | A1 | 5/2021 | Cheng |
| 2022/0197823 | A1 | 6/2022 | Cho et al. |

(Continued)

FOREIGN PATENT DOCUMENTS

| CN | 108920287 | 11/2018 |
| CN | 112699153 | 4/2021 |

(Continued)

OTHER PUBLICATIONS

"Let your money make more money from the stock market using artificial intelligence (AI)", [Online]. Retrieved from the Internet: https: jarvisinvest.com , (Accessed on Aug. 3, 2023), 15 pages.

"Time To Live (TTL)", [Online]. Retrieved from the Internet: https: www.imperva.com learn performance time-to-live-ttl , (Accessed on Jul. 28, 2024), 4 pages.

Basu, Soumya, "Adaptive TTL-Based Caching for Content Delivery", Proceedings of the 2017 ACM SIGMETRICS International Conference on Measurement and Modeling of Computer Systems., (Dec. 9, 2017), 27 pages.

(Continued)

*Primary Examiner* — Jorge A Casanova
(74) *Attorney, Agent, or Firm* — SCHWEGMAN LUNDBERG & WOESSNER, P.A.

(57) ABSTRACT

An electronic online system is configured to receive, at the electronic online system, an expression of a use case; determine, using a machine-learning technique with the expression of the use case as input, a data source and a time-to-live (TTL) value to satisfy the use case; and configure a data cache to store data received from the data source with the TTL value.

18 Claims, 5 Drawing Sheets

(56) References Cited

U.S. PATENT DOCUMENTS

| | | | |
|---|---|---|---|
| 2022/0366500 A1 | 11/2022 | Liu | |
| 2022/0414157 A1* | 12/2022 | Oliner | G06F 16/219 |
| 2023/0075676 A1* | 3/2023 | Deng | G06N 3/049 |
| 2023/0164075 A1 | 5/2023 | Gupta et al. | |
| 2023/0195058 A1 | 6/2023 | Cella et al. | |
| 2023/0222454 A1* | 7/2023 | Cella | G06N 7/01 |
| | | | 705/28 |
| 2023/0236552 A1 | 7/2023 | Cella et al. | |

FOREIGN PATENT DOCUMENTS

| | | |
|---|---|---|
| CN | 115544355 | 12/2022 |
| KR | 102482378 | 12/2022 |
| WO | 2023055364 | 4/2023 |

OTHER PUBLICATIONS

Narayanan, Arvind, "DeepCache: A Deep Learning Based Framework for Content Caching", In NetAI'18: ACM SIGCOMM 2018Workshop on Network Meets AI andML, Budapest, Hungary. ACM, New York, NY, USA,https: doi.org 10.1145 3229543.3229555, (Aug. 24, 2018), 6 pages.

Pylianidis, Christos, "Simulation-assisted machine learning for operational digital twins", Environmental Modelling and Software,vol. 148,2022, https: doi.org 10.1016 j.envsoft.2021.105274., (Dec. 14, 2021), 15 pages.

* cited by examiner

SYSTEM FOR MANAGING VENDOR DATA

BACKGROUND

Large organizations are generally made up of many separate business units. Each business unit may engage various vendors to provide services to the business unit and the organization. Data provided by the vendors require large amounts storage space and the operation of multiple applications on various company and personal computing devices. Even where a central administrative department handles vendor data, large organizations fail to leverage the full potential of the data generated by diverse computing systems, programs, and devices used within the organization.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
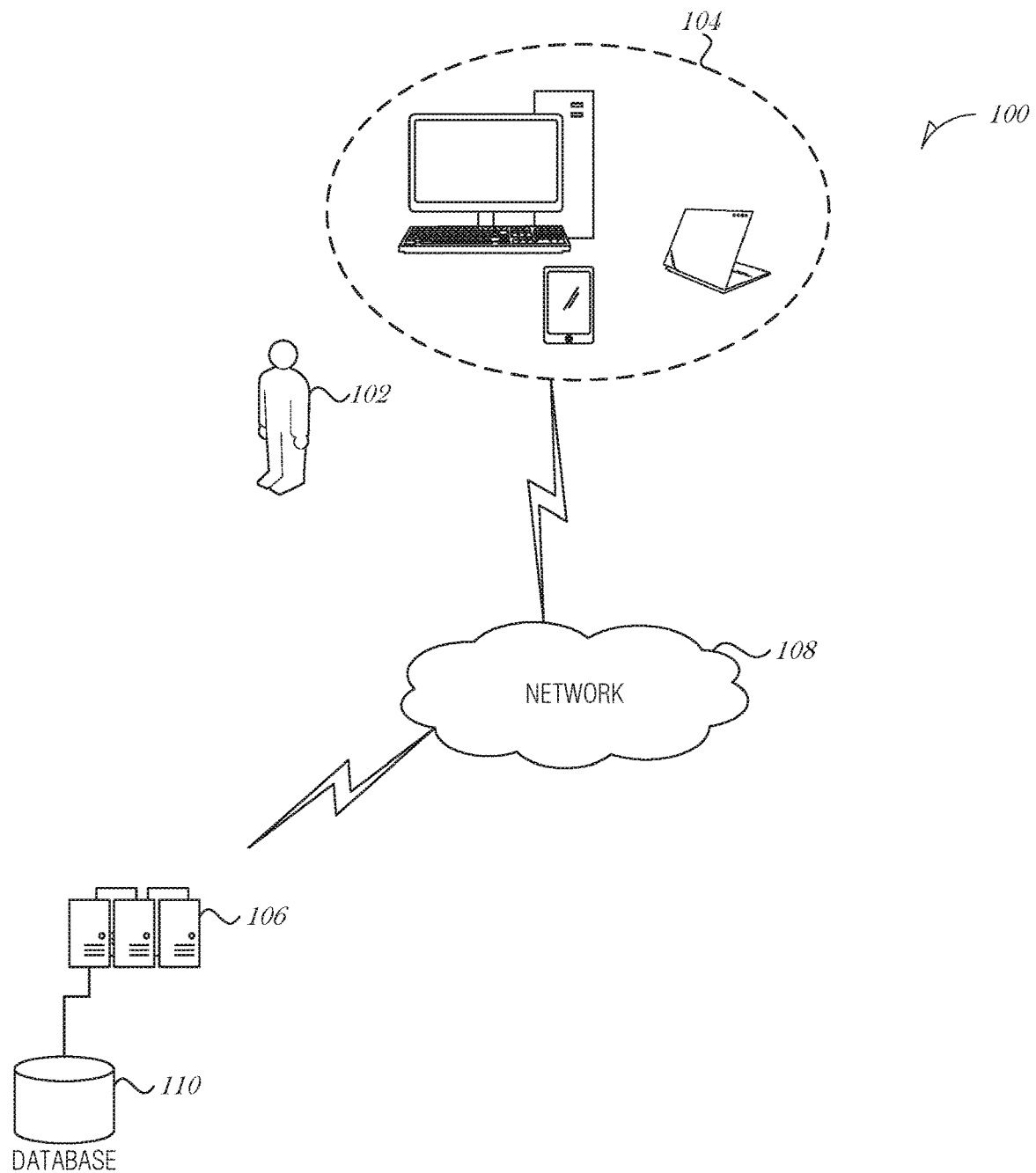
FIG. 1 is a diagram illustrating an operating environment, according to an embodiment.

In the following description, for purposes of explanation, numerous specific details are set forth in order to provide a thorough understanding of some example embodiments. It will be evident, however, to one skilled in the art that the present disclosure may be practiced without these specific details.

Systems and methods described herein provide a vendor data management system. Vendor data is data about, produced by, or used by a vendor of an organization. Vendors may be various people, organizations, or other entities that provide products or services to an organization. Vendors may be contractors, partners, or have other relationships with the organization.

In an organization, many vendors may be used to provide various products or services. In the context of a banking organization, vendors may provide information, such as stock prices, bid or ask prices, currency exchange rates, lending rates, dividend rates or amounts, expenses or earnings reports, or the like. Each vendor may use its own data format, database schema, or message format to convey the information. This type of diversity creates inefficiencies when business units in an organization need to convert the same vendor data to their own format for use.

The embodiments described herein solve the technical and internet-centric problem of storage and organizing large amounts of vendor information for use across an organization. One mechanism to improve performance is the use of caching. The systems and methods here use a form of intelligent database caching to optimize a user experience.

A cache is a component that stores data in a faster temporary storage device so that later requests can be served with a better response time by not having to access a slower main storage device. In the database context, a database cache is used to store database contents so that an application is provided the database contents from cache faster than from the underlying database. Caches may also be used for third-party application programming interfaces (API), microservices, or any other data source. Caching may also reduce costs to an organization because caching results from a third-party API may reduce the number of calls to the API that is billed on an API-use basis. Costs for microservice use may also be reduced by caching results.

One challenge of caching is staleness. Staleness refers to when the contents of cache no longer accurately represent the underlying data. To counteract staleness, cache contents are subject to an expiration policy. The expiration policy defines when content is considered too stale to be useful. A time-to-live (TTL) value may be used to measure cache staleness. When cache contents are initially stored, a TTL may be set and then begin to count down. When the TTL expires, the cache contents are considered expired and flushed from cache or refreshed from the underlying data source. The systems and methods described herein provide TTL values for a particular data source. Each data source (e.g., API, microservice, database, etc.) may have a corresponding TTL. The TTL may be configurable for the same data source based on different use cases. The configuration of the TTL may be based on machine learning mechanisms to actively predict the appropriate TTL for any given data source.

One factor used when considering the TTL or amount of acceptable data staleness is a cost-benefit analysis for the use case. Depending on the use case, a user may not always need real-time data. As such, some data may rest for longer than other data. Because obtaining fresh data may come with a monetary cost, a cost-benefit analysis can be used to optimize the acceptable data staleness for a particular use case. These functions and others are described in more detail below.

FIG. 1 is a diagram illustrating an operating environment 100, according to an embodiment. A user 102 may use a user device 104 to access a vendor data management system 106. The user device 104 may be of any type of form factor including, but not limited to a desktop computer, a mobile device, a laptop computer, a smartphone, a tablet device, a personal digital assistant, or the like. The user 102 may be a person who fulfils a role, such as a system administrator, a business executive, a group manager, business unit administrator, financial advisor, or the like. Each role may have different permissions to execute functions or operations in the vendor data management system 106. For instance, an administrator may be allowed to create a new data adapter configuration, delete an existing data adapter configuration, or revise a data adapter configuration. A person with a non-elevated privilege (e.g., a regular user) may only have permissions to submit requests to the vendor data management system 106.

The vendor data management system 106 may include various web servers, database servers, proxy devices, firewalls, storage devices, and network devices. The vendor data management system 106 may provide a web-based interface accessible via a uniform resource locator (URL). The vendor data management system 106 may provide various levels of security, such as requiring an account with a username and password, a secure channel (e.g., HTTPS), two-factor authentication, and the like.

To connect to the vendor data management system 106, the user 102 may execute an application ("app") to connect via a network 108. The app may be an internet browser application. In various examples, the servers and components in the operating environment 100 may communicate via one or more networks such as network 108. The network 108 may include one or more of local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. The network 108 may include a single local area network (LAN) or wide-area network (WAN), or combinations of LANs or WANs, such as the Internet.

Data used in the vendor data management system 106 may be organized and stored in a variety of manners. For convenience, the organized collection of data is described herein as a database 110. The specific storage layout and model used in the database 110 may take a number of forms-indeed, the database 110 may utilize multiple models. The database 110 may be, but is not limited to, a relational database (e.g., SQL), non-relational database (NoSQL), a flat file database, object model, document details model, or a file system hierarchy. The database 110 may be implemented using MongoDB using a JavaScript Object Notation (JSON) data format. The database 110 may store data on one or more storage devices (e.g., a hard disk, random access memory (RAM), etc.). The database 110 may include a cache database, such as Redis, to cache some or all of the database contents. The storage devices may be in standalone arrays, part of one or more servers, and may be located in one or more geographic areas.

A database management system (DBMS) may be used to access the data stored within the database 110. The DBMS may offer options to search the database 110 using a query and then return data in the database 110 that meets the criteria in the query. The DBMS may be implemented, at least in part, with MongoDB Atlas. The DBMS may operate on one or more of the components of the cloud configuration management system 106.

In operation, a user 102 may log into the vendor data management system 106 to create or modify database cache configurations or database configurations. Depending on the privileges and the role of the user 102, various components of the vendor data management system 106 are visible and accessible.

Figure 2:
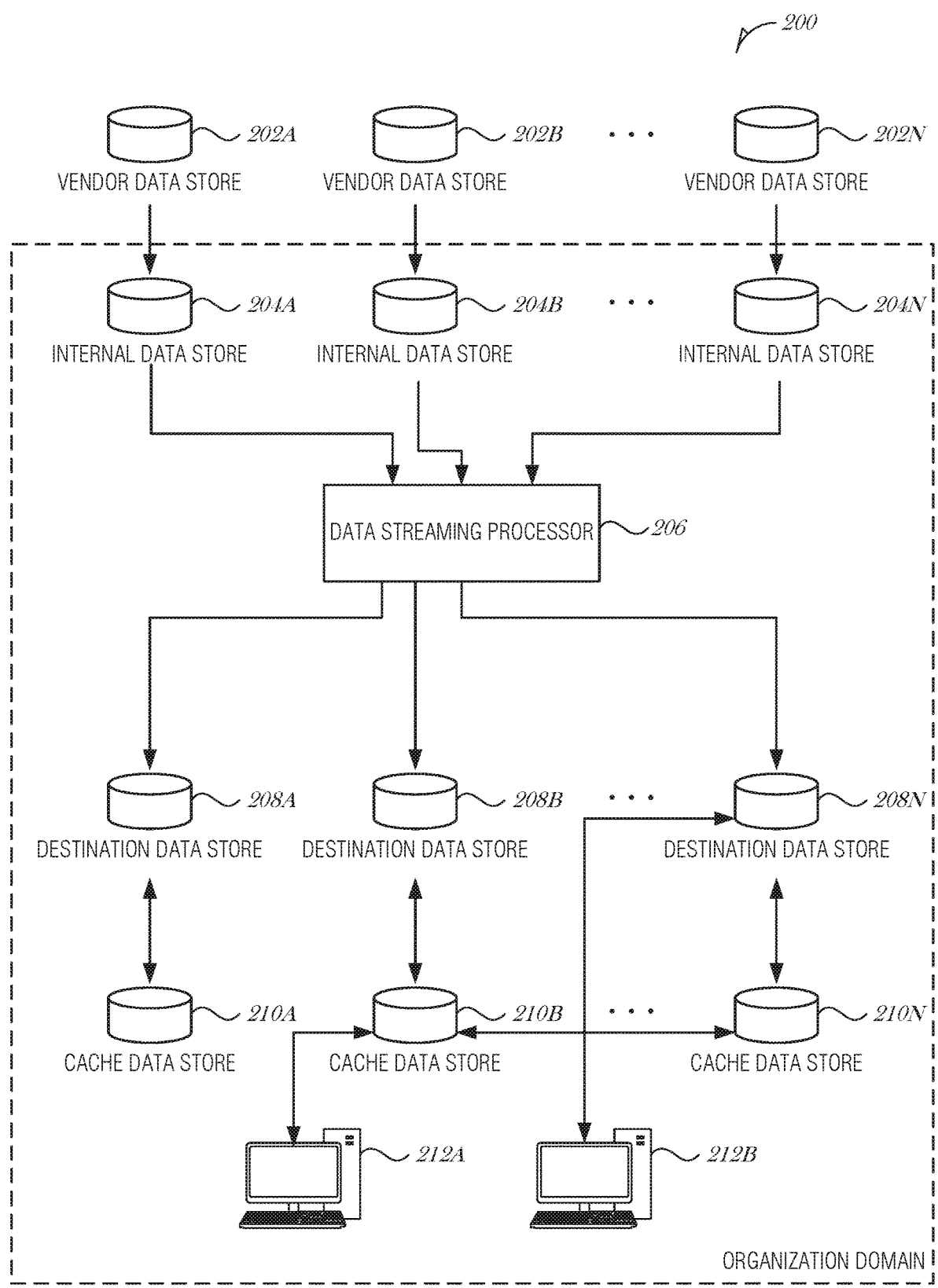
FIG. 2 is a block diagram illustrating control and data flow for data adaptation, according to an embodiment.

FIG. 2 is a block diagram illustrating control and data flow 200 for data adaptation, according to an embodiment. Vendor data is stored at one or more external data stores 202A-N. The vendor data stores 202A-N are replicated to internal data stores 204A-N. The replicated internal data stores 204A-N may be synchronized on a regular basis to ensure that the internal data sources 204A-N accurately reflect up-to-date revisions of the vendor data sources 202A-N. For instance, a change data capture (CDC) process may be used to identify and capture changes made to data in the vendor data source 202A-N and then relay those changes in real-time to update the corresponding internal data source 204A-N.

A data streaming processor 206 interfaces with the internal data stores 204A-N to obtain data. The data streaming processor 206 may be configured to perform stream processing, manage data pipelines, and integrate with an organization's network to distribute data across multiple nodes for a highly available deployment. The data streaming processor 206 may be configured to collect and process large amounts of data from the internal data stores 204A-N and then deliver results to various destinations. The data streams may be managed using filters, transformations, and aggregations in real-time. The data streaming processor 206 may operate on a publish and subscribe (pub/sub) model where data is published to any number of systems or real-time applications. In an embodiment, the data streaming processor 206 is Apache Kafka, which is capable of managing data pipelines by ingesting data from sources into Kafka as it is created and then streaming that data from Kafka to one or more destinations. The pub/sub model may implement the concept of topics, where subscribers are able to subscribe to a topic in Kafka and Kafka publishes data to certain topics based on how the topic is configured. In Kafka, Kafka Connectors are used to connect with data stores for both data ingesting and exporting.

One or more destination data stores 208A-N are targets of the data streaming processor 206. The destination data stores 208A-N may include a database, such as a Mongo database, which is configured to serve a particular group of the organization (e.g., a business unit in a corporation) or a particular use case (e.g., application or platform used by one or more business units).

In an embodiment, when a destination data store 208A-N is updated by the data streaming processor 206, changes to data may be reflected in an end application or user interface by pushing changes automatically from the destination data store 208A-N to the end application or user interface. This may be performed using Representational State Transfer (REST) APIs, for instance.

Both internal data stores 204A-N and destination data stores 208A-N may be of any type of database structure including but not limited to SQL databases (e.g., Microsoft SQL Server, MySQL, Oracle Database, Sybase, PostgreSQL, etc.) or NoSQL databases (e.g., MongoDB, CouchDB, Oracle NoSQL, Apache HBase, Redis, Firebase, etc.). Internal data stores 204A-N are typically of the same type of database structure as the database being replicated (e.g., the corresponding vendor data store 202A-N), however, this is not a requirement and the internal data store 204A-N may be of a different type of database structure with replication being supported with a transformation function or an ETL function. The database structure used for destination data stores 208A-N is driven by the business use case for the particular destination data store 208A-N. As such, regardless of the database structure used for the internal data stores 204A-N, the destination data stores 208A-N may be optimally designed for a particular use case.

Figure 3:
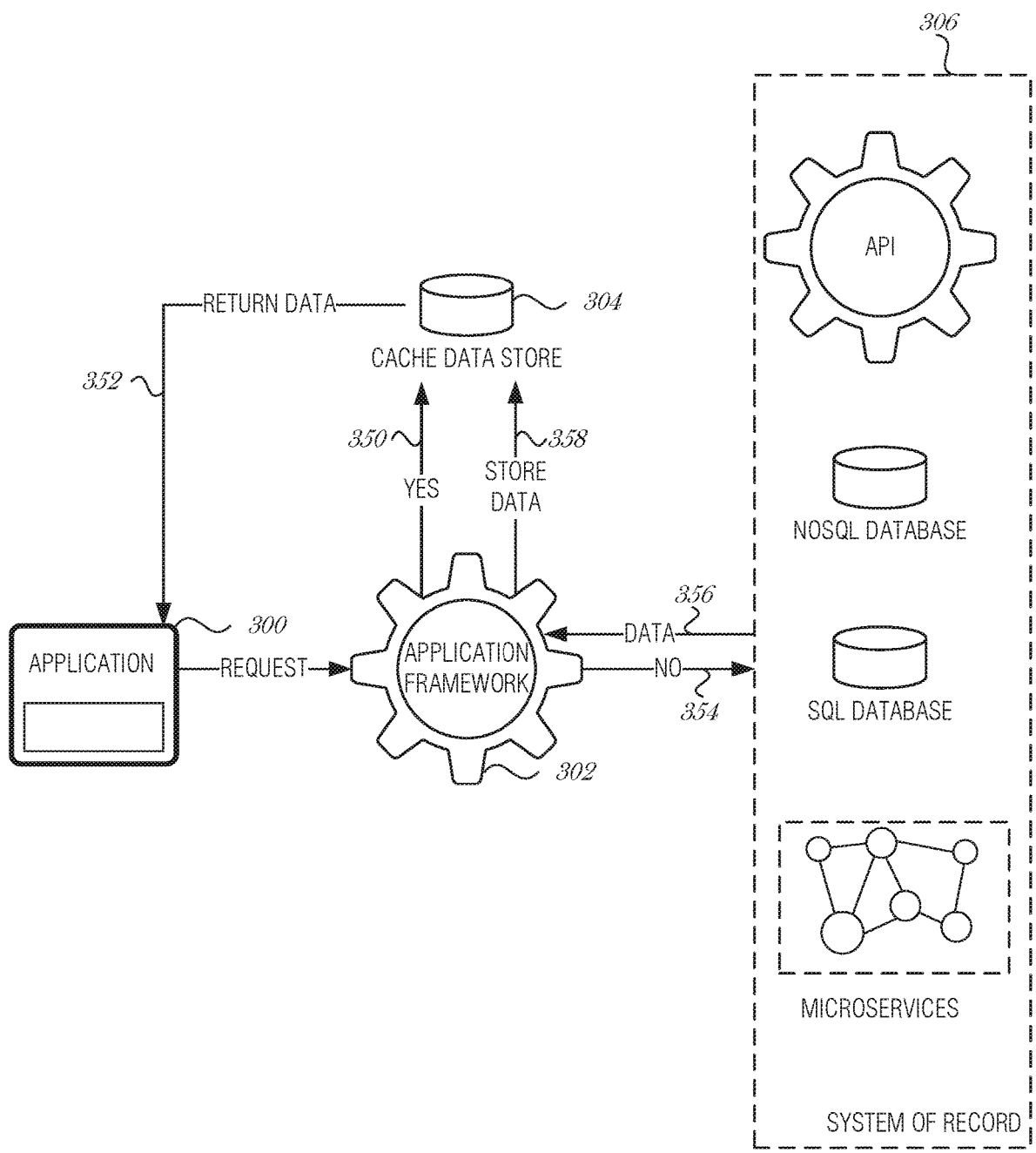
FIG. 3 is a diagram illustrating an operating environment, according to an embodiment.

Cache data stores 210A-N are used to cache contents from a corresponding destination data store 208A-N. Cache data stores 210A-N may also cache data from other data source, as illustrated in FIG. 3. Destination data stores 208A-N and cache data stores 210A-N are accessed by clients 212A and 212B. Depending on the applications executing on clients 212A or 212B, one or more destination data stores 208A-N or cache data stores 210A-N may be accessed.

FIG. 3 is a diagram illustrating an operating environment, according to an embodiment. An application (e.g., client app) 300 accesses an application framework 302 to request data. The application framework 302 first checks the cache data store 304 and if the data is in the cache data store 304 (e.g., a cache hit) (operation 350), then the data is served from the cache data store 304 to the application 300 (operation 352). If the data is not in the cache data store 304 (e.g., a cache miss) (operation 354), then the system of record 306 (e.g., destination data store 208, internal data store 204, or vendor data store 202) is accessed to obtain the requested data (operation 356). The data is stored in the cache data store 304 and then served from the cache data store 304 to the application 300 (operation 352).

The application framework 302 may be integrated into one or more microservices or applications. The application framework 302 may be implemented as a service, a library, or other auxiliary component that exposes an API to the application 300. The application framework 302 acts as a data retrieval API and controls the TTL for data sources accessed by the application 300. The application 300 may configure the application framework 302 by specifying the data source and the TTL to use for the data source. The data source may be a single datum (e.g., asset class of company stock) or a data feed (e.g., real-time buy price of company stock). As data is obtained from the data source by the application framework 302, the data is stored in the cache data store 304 with the specified TTL. Later calls to the application framework 302 for the same data allows the application framework 302 to manage the cached data outside of any cache management built into the cache data store 304 itself. Thus, the application framework 302 can be configured to store data with different TTL for different data from the same system of record 306 (or for the same data from different systems of record 306).

In the event of a cache miss, there is substantial latency introduced by having to obtain the data from the system of record 306. The cache data store 304 may be an in-memory data structure store, such as Redis. The system of record 306 may be a relational database (SQL database) (e.g., Microsoft SQL Server, MySQL, Oracle Database, Sybase, PostgreSQL, etc.), a NoSQL database (e.g., MongoDB, CouchDB, Oracle NoSQL, Apache HBase, Redis, Firebase, etc.), an array of microservices, a third-party API used to access an external data store, or another data source. In an embodiment, the cache data store 304 is a Redis cache and the system of record is a MongoDB. In such an embodiment, the Redis cache is configured to store MongoDB documents.

To reduce having to access the system of record 306, and therefore expend money and resources to obtain data, different caching mechanisms may be implemented. One caching mechanism is to customize acceptable data staleness based on use case or preferences. A user may not need immediate real-time data in all use cases. Data staleness may be set for different data from the same data source.

In a use case of general financial advising, to determine an estimated net worth, using up-to-date real-time data is more precise than what is needed, especially in view of the cost of an up-to-date real-time data feed from a third-party API. Instead, a financial advisor who provides their clients net worth estimates may safely use older data, such as data is that is on a 20-minute delay or a 24-hour delay. By using fewer calls to an API, or calls for data that is not in real-time, the data is less expensive. Additionally, retrieving older "real-time" data may be less expensive than retrieving up-to-date real-time data.

In another use case of daily stock trading, having instant, up-to-date real-time data is critical to stock traders or financial advisors to be able to accurately and fully inform their decisions. As such, because of the use case, the benefit of retrieving up-to-date real-time data outweighs the cost. In each use case, the data provider for some of the data may be the same. However, using day-old stock price data is acceptable to estimate net worth, whereas using real-time up-to-date stock price data is needed for daily trading.

Thus, the caching mechanism to customize acceptable data staleness can be based on a cost-benefit analysis in view of the use case. This cost-benefit analysis may be performed with a machine-learning model. Automation may be used to implement or configure a data feed based on the cost-benefit analysis. Implementing or configuring the data feed may include actions such as determining which data is needed for a particular use case, determining data sources of the needed data, configuring a periodicity of an API call for data from data sources, or setting a TTL for data in a data cache.

A second caching mechanism is to set the TTL per data source based on access path. Using this second caching mechanism, the TTL for any data received from the data source via the same access path has the same TTL in cache. A machine-learning model may be used to actively predict an appropriate TTL for a given data feed. When an API is used to obtain data from the data source, this provides cache control at the API level.

In some cases, the API is called with a data source and a specified TTL value. This specified TTL value may be different from the TTL value that was previously set (e.g., by the machine-learning technique or manually by another application). The specified revised TTL value may be used to train the machine-learning technique as a reinforcement learning mechanism. The specified TTL may be used in the data cache in place of the previously set value. Alternatively, the machine-learning model may be used again after being retrained to set a new TTL value.

Regardless of which data caching mechanism is used, either per data source based on use case or per data source based on access path, the users who use the cached data may be notified of an upcoming expiration, remaining TTL, or that the data has expired (exists past TTL). After a data's TTL has expired, instead of immediately or automatically flushing the data from cache, an application or a user may be provided an option to continue using the data. The application or user may choose to continue using expired data to avoid incurring costs of obtaining new data. A timestamp of when the data was first retrieved or when the data expired may be provided to the user to aid the user's decision.

In another embodiment, a set of applications that use the data may be identified. When the data expires, the set of applications may be notified of the data's expiration, the data refresh from the system of record 306, or other status changes of the data. A record of which applications access the data may be logged to determine the applications to notify when data changes, expires, or is refreshed.

Figure 4:
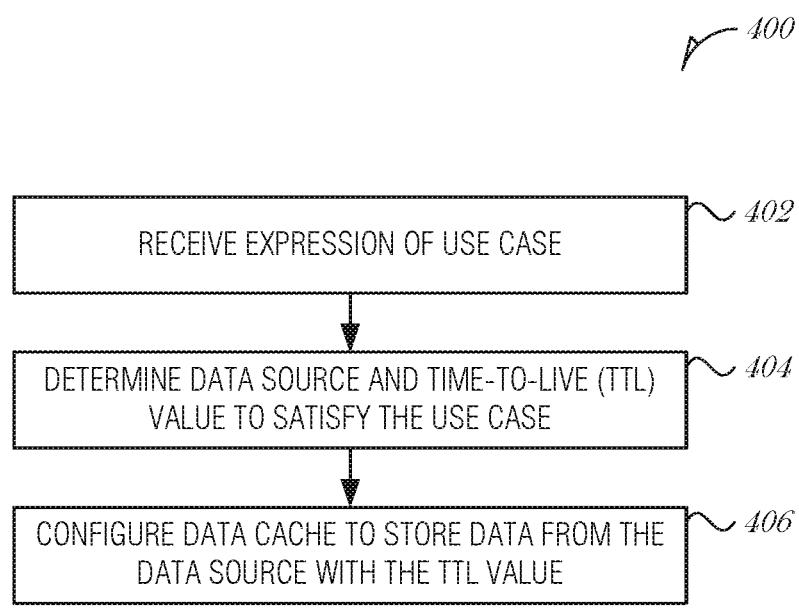
FIG. 4 is a flowchart illustrating a method for configuring a data cache controller, according to an embodiment.

FIG. 4 is a flowchart illustrating a method 400 for configuring a data cache controller, according to an embodiment. The method 400 may be performed by an electronic online system (e.g., vendor data management system 106) or any of the modules, logic, circuits, processors, or components described herein.

At 402, an expression of a use case is received at the electronic online system.

At 404, a machine-learning technique is used to determine a data source and a time-to-live (TTL) value to satisfy the use case, with the expression of the use case as input. In an embodiment, the machine-learning technique is trained to use a cost-benefit analysis to determine the TTL value for the use case.

At 406, a data cache is configured to store data received from the data source with the TTL value. In an embodiment, the received data is stored in a cache with an expiration based on the TTL value.

In various embodiments, the expression of the use case is formed as a query, a business objective, or a description of an output. In an embodiment, the expression of the use case does not include the data source. Instead, the data source may be inferred, calculated, or determined based on analyzing the expression of the use case. In an embodiment, the data source includes a database with a SQL database structure. In another embodiment, the data source includes a database with a NoSQL database structure. In an embodiment, the data cache includes an in-memory data structure store.

In an embodiment, the data in the data cache includes JavaScript Object Notation (JSON) documents. In another embodiment, the data in the data cache includes JavaScript Object Notation (JSON) strings. In another embodiment, the data cache includes a Redis data structure store.

In an embodiment, the method 400 includes receiving, from an application, a read request for data in the data cache. The method 400 may then proceed by determining that the data has expired based on a time-to-live (TTL) value corresponding to the data and transmitting a query to the application to determine whether to use the data even though the data has expired. The method 400 may also conditionally refresh the data in the data cache based on a response to the query.

In an embodiment, the method 400 includes receiving, from an application, a read request for data in the data cache. The method 400 may then proceed by determining that the data has expired based on a time-to-live (TTL) value corresponding to the data, refreshing the data in the data cache, and notifying the application that the data in the data cache has been refreshed.

In an embodiment, the method 400 includes receiving, from an application, a read request for data in the data cache, the read request including the data source and a revised TTL value. The method 400 may then proceed by using the revised TTL value to train the machine-learning technique and configuring the data cache to store data received from the data source with the revised TTL value.

In an embodiment, the method 400 includes receiving, from an application, a read request for data in the data cache. The method 400 may then proceed by determining that the data has expired based on a time-to-live (TTL) value corresponding to the data, refreshing the data in the data cache, determining a set of applications that use the data from the data cache, and notifying the set of applications that the data in the data cache has been refreshed.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 5:
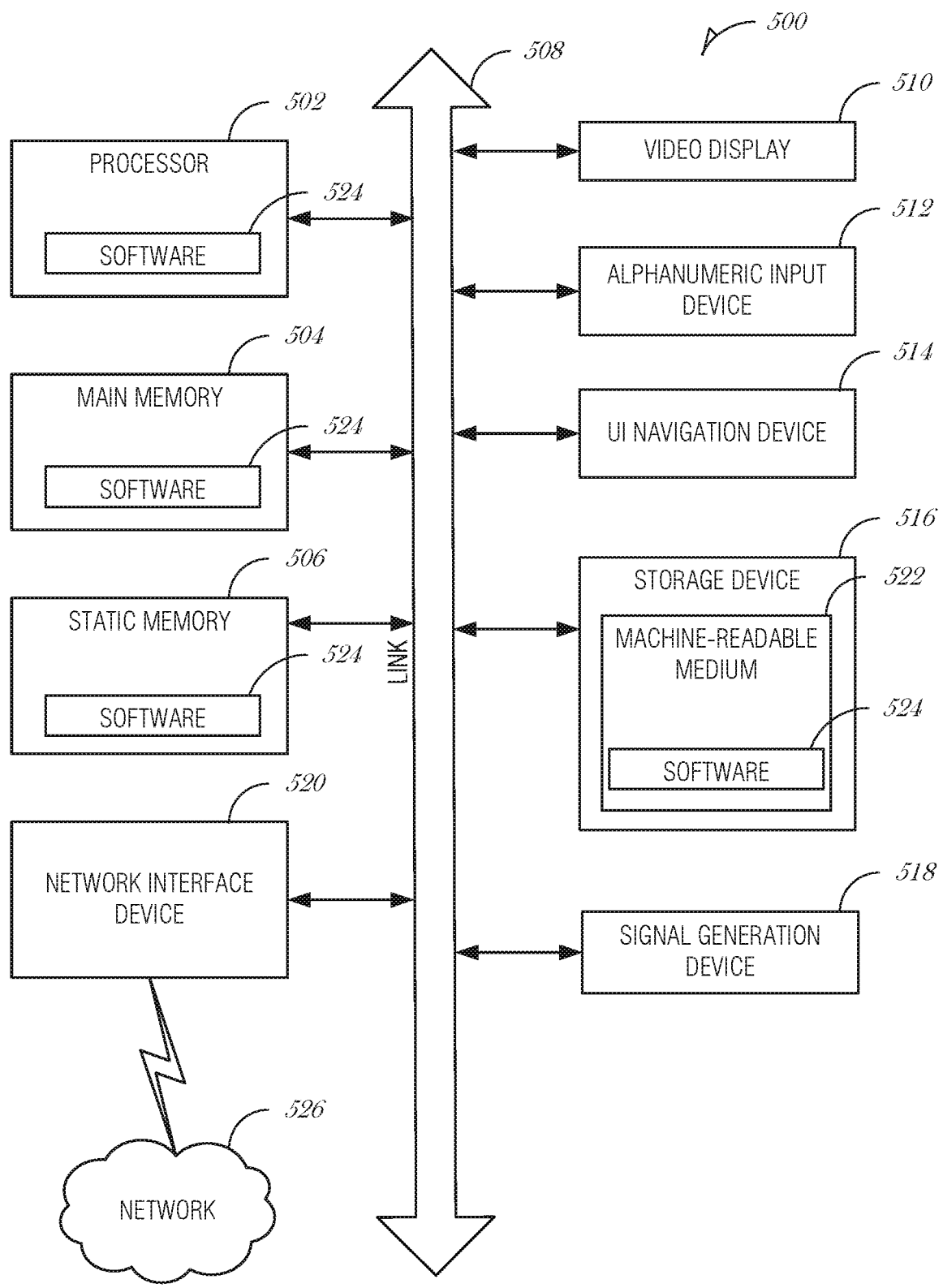
FIG. 5 is a block diagram illustrating an example machine upon which any one or more of the techniques (e.g., methodologies) discussed herein may perform, according to an example embodiment.

FIG. 5 is a block diagram illustrating a machine in the example form of a computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, set-top box, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, 4G LTE/LTE-A, 5G, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 is an electronic online system comprising: a processor subsystem; and a memory including instructions, which when executed by the processor subsystem, cause the processor subsystem to: receive, at the electronic online system, an expression of a use case; determine, using a machine-learning technique with the expression of the use case as input, a data source and a time-to-live (TTL) value to satisfy the use case; and configure a data cache to store data received from the data source with the TTL value.

In Example 2, the subject matter of Example 1 includes, wherein the expression of the use case is formed as a query.

In Example 3, the subject matter of Examples 1-2 includes, wherein the expression of the use case is formed as a business objective.

In Example 4, the subject matter of Examples 1-3 includes, wherein the expression of the use case is formed as a description of an output.

In Example 5, the subject matter of Examples 1-4 includes, wherein the expression of the use case does not include the data source.

In Example 6, the subject matter of Examples 1-5 includes, wherein the data source includes a database with a SQL database structure.

In Example 7, the subject matter of Examples 1-6 includes, wherein the data source includes a database with a NoSQL database structure.

In Example 8, the subject matter of Examples 1-7 includes, wherein the data cache includes an in-memory data structure store.

In Example 9, the subject matter of Example 8 includes, wherein the data in the data cache includes JavaScript Object Notation (JSON) documents.

In Example 10, the subject matter of Examples 8-9 includes, wherein the data in the data cache includes JavaScript Object Notation (JSON) strings.

In Example 11, the subject matter of Examples 1-10 includes, wherein the data cache includes a Redis data structure store.

In Example 12, the subject matter of Examples 1-11 includes, wherein the machine-learning technique is trained to use a cost-benefit analysis to determine the TTL value for the use case.

In Example 13, the subject matter of Examples 1-12 includes, wherein the memory includes instructions, which when executed by the processor subsystem, cause the processor subsystem to: receive, from an application, a read request for data in the data cache; determine that the data has expired based on a time-to-live (TTL) value corresponding to the data; transmit a query to the application to determine whether to use the data even though the data has expired; and conditionally refresh the data in the data cache based on a response to the query.

In Example 14, the subject matter of Examples 1-13 includes, wherein the memory includes instructions, which when executed by the processor subsystem, cause the processor subsystem to: receive, from an application, a read request for data in the data cache; determine that the data has expired based on a time-to-live (TTL) value corresponding to the data; refresh the data in the data cache; and notify the application that the data in the data cache has been refreshed.

In Example 15, the subject matter of Examples 1-14 includes, wherein the memory includes instructions, which when executed by the processor subsystem, cause the processor subsystem to: receive, from an application, a read request for data in the data cache, the read request including the data source and a revised TTL value; use the revised TTL value to train the machine-learning technique; and configure the data cache to store data received from the data source with the revised TTL value.

In Example 16, the subject matter of Examples 1-15 includes, wherein the memory includes instructions, which when executed by the processor subsystem, cause the processor subsystem to: receive, from an application, a read request for data in the data cache; determine that the data has expired based on a time-to-live (TTL) value corresponding to the data; refresh the data in the data cache; determine a set of applications that use the data from the data cache; and notify the set of applications that the data in the data cache has been refreshed.

Example 17 is a method performed on an electronic online system, the method comprising: receiving, at the electronic online system, an expression of a use case; determining, using a machine-learning technique with the expression of the use case as input, a data source and a time-to-live (TTL) value to satisfy the use case; and configuring a data cache to store data received from the data source with the TTL value.

In Example 18, the subject matter of Example 17 includes, wherein the expression of the use case is formed as a query.

In Example 19, the subject matter of Examples 17-18 includes, wherein the expression of the use case is formed as a business objective.

In Example 20, the subject matter of Examples 17-19 includes, wherein the expression of the use case is formed as a description of an output.

In Example 21, the subject matter of Examples 17-20 includes, wherein the expression of the use case does not include the data source.

In Example 22, the subject matter of Examples 17-21 includes, wherein the data source includes a database with a SQL database structure.

In Example 23, the subject matter of Examples 17-22 includes, wherein the data source includes a database with a NoSQL database structure.

In Example 24, the subject matter of Examples 17-23 includes, wherein the data cache includes an in-memory data structure store.

In Example 25, the subject matter of Example 24 includes, wherein the data in the data cache includes JavaScript Object Notation (JSON) documents.

In Example 26, the subject matter of Examples 24-25 includes, wherein the data in the data cache includes JavaScript Object Notation (JSON) strings.

In Example 27, the subject matter of Examples 17-26 includes, wherein the data cache includes a Redis data structure store.

In Example 28, the subject matter of Examples 17-27 includes, wherein the machine-learning technique is trained to use a cost-benefit analysis to determine the TTL value for the use case.

In Example 29, the subject matter of Examples 17-28 includes, receiving, from an application, a read request for data in the data cache; determining that the data has expired based on a time-to-live (TTL) value corresponding to the data; transmitting a query to the application to determine whether to use the data even though the data has expired; and conditionally refreshing the data in the data cache based on a response to the query.

In Example 30, the subject matter of Examples 17-29 includes, receiving, from an application, a read request for data in the data cache; determining that the data has expired based on a time-to-live (TTL) value corresponding to the data; refreshing the data in the data cache; and notifying the application that the data in the data cache has been refreshed.

In Example 31, the subject matter of Examples 17-30 includes, receiving, from an application, a read request for data in the data cache, the read request including the data source and a revised TTL value; using the revised TTL value to train the machine-learning technique; and configuring the data cache to store data received from the data source with the revised TTL value.

In Example 32, the subject matter of Examples 17-31 includes, receiving, from an application, a read request for data in the data cache; determining that the data has expired based on a time-to-live (TTL) value corresponding to the data; refreshing the data in the data cache; determining a set of applications that use the data from the data cache; and notifying the set of applications that the data in the data cache has been refreshed.

Example 33 is a non-transitory machine-readable medium comprising instructions, which when executed by a machine in an electronic online system, cause the machine to: receive, at the electronic online system, an expression of a use case; determine, using a machine-learning technique with the expression of the use case as input, a data source and a time-to-live (TTL) value to satisfy the use case; and configure a data cache to store data received from the data source with the TTL value.

In Example 34, the subject matter of Example 33 includes, wherein the expression of the use case is formed as a query.

In Example 35, the subject matter of Examples 33-34 includes, wherein the expression of the use case is formed as a business objective.

In Example 36, the subject matter of Examples 33-35 includes, wherein the expression of the use case is formed as a description of an output.

In Example 37, the subject matter of Examples 33-36 includes, wherein the expression of the use case does not include the data source.

In Example 38, the subject matter of Examples 33-37 includes, wherein the data source includes a database with a SQL database structure.

In Example 39, the subject matter of Examples 33-38 includes, wherein the data source includes a database with a NoSQL database structure.

In Example 40, the subject matter of Examples 33-39 includes, wherein the data cache includes an in-memory data structure store.

In Example 41, the subject matter of Example 40 includes, wherein the data in the data cache includes JavaScript Object Notation (JSON) documents.

In Example 42, the subject matter of Examples 40-41 includes, wherein the data in the data cache includes JavaScript Object Notation (JSON) strings.

In Example 43, the subject matter of Examples 33-42 includes, wherein the data cache includes a Redis data structure store.

In Example 44, the subject matter of Examples 33-43 includes, wherein the machine-learning technique is trained to use a cost-benefit analysis to determine the TTL value for the use case.

In Example 45, the subject matter of Examples 33-44 includes, wherein the memory includes instructions, which when executed by the machine, cause the machine to: receive, from an application, a read request for data in the data cache; determine that the data has expired based on a time-to-live (TTL) value corresponding to the data; transmit a query to the application to determine whether to use the data even though the data has expired; and conditionally refresh the data in the data cache based on a response to the query.

In Example 46, the subject matter of Examples 33-45 includes, wherein the memory includes instructions, which when executed by the machine, cause the machine to: receive, from an application, a read request for data in the data cache; determine that the data has expired based on a time-to-live (TTL) value corresponding to the data; refresh the data in the data cache; and notify the application that the data in the data cache has been refreshed.

In Example 47, the subject matter of Examples 33-46 includes, wherein the memory includes instructions, which when executed by the machine, cause the machine to: receive, from an application, a read request for data in the data cache, the read request including the data source and a revised TTL value; use the revised TTL value to train the machine-learning technique; and configure the data cache to store data received from the data source with the revised TTL value.

In Example 48, the subject matter of Examples 33-47 includes, wherein the memory includes instructions, which when executed by the machine, cause the machine to: receive, from an application, a read request for data in the data cache; determine that the data has expired based on a time-to-live (TTL) value corresponding to the data; refresh the data in the data cache; determine a set of applications that use the data from the data cache; and notify the set of applications that the data in the data cache has been refreshed.

Example 49 is at least one machine-readable medium including instructions that, when executed by processing circuitry, cause the processing circuitry to perform operations to implement of any of Examples 1-48.

Example 50 is an apparatus comprising means to implement of any of Examples 1-48.

Example 51 is a system to implement of any of Examples 1-48.

Example 52 is a method to implement of any of Examples 1-48.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An electronic online system comprising:
   a processor subsystem; and
   a memory including instructions, which when executed by the processor subsystem, cause the processor subsystem to:
   receive, at the electronic online system, an expression of a use case;
   determine, using a machine-learning technique with the expression of the use case as input, a data source and a time-to-live (TTL) value to satisfy the use case;
   configure a data cache to store data received from the data source with the TTL value;
   receive, from an application, a read request for data in the data cache, the read request including the data source and a revised TTL value;
   use the revised TTL value to train the machine-learning technique; and
   configure the data cache to store data received from the data source with the revised TTL value.

2. The electronic system of claim 1, wherein the expression of the use case is formed as a query.

3. The electronic system of claim 1, wherein the expression of the use case is formed as a business objective.

4. The electronic system of claim 1, wherein the expression of the use case is formed as a description of an output.

5. The electronic system of claim 1, wherein the expression of the use case does not include the data source.

6. The electronic system of claim 1, wherein the data source includes a database with a SQL database structure.

7. The electronic system of claim 1, wherein the data source includes a database with a NoSQL database structure.

8. The electronic system of claim 1, wherein the data cache includes an in-memory data structure store.

9. The electronic system of claim 8, wherein the data in the data cache includes JavaScript Object Notation (JSON) documents.

10. The electronic system of claim 8, wherein the data in the data cache includes JavaScript Object Notation (JSON) strings.

11. The electronic system of claim 1, wherein the data cache includes a Redis data structure store.

12. The electronic system of claim 1, wherein the machine-learning technique is trained to use a cost-benefit analysis to determine the TTL value for the use case.

13. The electronic system of claim 1, wherein the memory includes instructions, which when executed by the processor subsystem, cause the processor subsystem to:
   receive, from an application, a read request for data in the data cache;
   determine that the data has expired based on a time-to-live (TTL) value corresponding to the data;
   transmit a query to the application to determine whether to use the data even though the data has expired; and
   conditionally refresh the data in the data cache based on a response to the query.

14. The electronic system of claim 1, wherein the memory includes instructions, which when executed by the processor subsystem, cause the processor subsystem to:
   receive, from an application, a read request for data in the data cache;
   determine that the data has expired based on a time-to-live (TTL) value corresponding to the data;
   refresh the data in the data cache; and
   notify the application that the data in the data cache has been refreshed.

15. The electronic system of claim 1, wherein the memory includes instructions, which when executed by the processor subsystem, cause the processor subsystem to:
   receive, from an application, a read request for data in the data cache;
   determine that the data has expired based on a time-to-live (TTL) value corresponding to the data;
   refresh the data in the data cache;
   determine a set of applications that use the data from the data cache; and
   notify the set of applications that the data in the data cache has been refreshed.

16. A method performed on an electronic online system, the method comprising:
   receiving, at the electronic online system, an expression of a use case;
   determining, using a machine-learning technique with the expression of the use case as input, a data source and a time-to-live (TTL) value to satisfy the use case;
   configuring a data cache to store data received from the data source with the TTL value;
   receiving, from an application, a read request for data in the data cache, the read request including the data source and a revised TTL value;
   using the revised TTL value to train the machine-learning technique; and
   configuring the data cache to store data received from the data source with the revised TTL value.

17. The method of claim 16, comprising:
   receiving, from an application, a read request for data in the data cache;
   determining that the data has expired based on a time-to-live (TTL) value corresponding to the data;
   refreshing the data in the data cache;
   determining a set of applications that use the data from the data cache; and
   notifying the set of applications that the data in the data cache has been refreshed.

18. A non-transitory machine-readable medium comprising instructions, which when executed by a machine in an electronic online system, cause the machine to:
   receive, at the electronic online system, an expression of a use case;
   determine, using a machine-learning technique with the expression of the use case as input, a data source and a time-to-live (TTL) value to satisfy the use case;
   configure a data cache to store data received from the data source with the TTL value;
   receive, from an application, a read request for data in the data cache, the read request including the data source and a revised TTL value;
   use the revised TTL value to train the machine-learning technique; and
   configure the data cache to store data received from the data source with the revised TTL value.

* * * * *